United States Patent
Chhabra et al.

(10) Patent No.: US 9,572,120 B2
(45) Date of Patent: Feb. 14, 2017

(54) SYNCHRONIZATION REQUESTS TO REDUCE POWER CONSUMPTION

(71) Applicant: Apple Inc., Cupertino, CA (US)

(72) Inventors: Kapil Chhabra, Milpitas, CA (US); Veerendra M. Boodannavar, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 461 days.

(21) Appl. No.: 13/689,494

(22) Filed: Nov. 29, 2012

(65) Prior Publication Data
US 2014/0086233 A1 Mar. 27, 2014

Related U.S. Application Data

(60) Provisional application No. 61/705,022, filed on Sep. 24, 2012.

(51) Int. Cl.
*H04W 56/00* (2009.01)

(52) U.S. Cl.
CPC ........... *H04W 56/001* (2013.01); *H04W 56/00* (2013.01); *Y02B 60/50* (2013.01)

(58) Field of Classification Search
CPC .......................... H04W 56/00; H04W 56/001
USPC 370/350, 453, 328, 329, 330, 338; 375/356, 358
See application file for complete search history.

(56) References Cited

U.S. PATENT DOCUMENTS

| | | | |
|---|---|---|---|
| 6,321,274 B1* | 11/2001 | Shakib et al. | 719/330 |
| 9,021,169 B2* | 4/2015 | Lee | G06F 13/14 710/110 |
| 2006/0218229 A1* | 9/2006 | Pandey | H04W 76/023 709/203 |
| 2007/0091934 A1* | 4/2007 | Myles | H04J 3/0664 370/503 |
| 2007/0286222 A1* | 12/2007 | Balasubramanian | H04L 12/12 370/412 |
| 2008/0085690 A1* | 4/2008 | Shnayderman | H04W 48/16 455/187.1 |
| 2008/0294784 A1* | 11/2008 | Wang | 709/228 |
| 2009/0310578 A1* | 12/2009 | Convertino et al. | 370/338 |
| 2010/0097969 A1* | 4/2010 | De Kimpe | H04W 52/0216 370/311 |
| 2012/0072481 A1* | 3/2012 | Nandlall | G06F 9/5027 709/203 |
| 2012/0311168 A1* | 12/2012 | Dougan | H04L 69/28 709/230 |

* cited by examiner

*Primary Examiner* — Mohamed Kamara
*Assistant Examiner* — Thad Defauw
(74) *Attorney, Agent, or Firm* — Sterne, Kessler, Goldstein and Fox P.L.L.C.

(57) ABSTRACT

An electronic device is described. In order to facilitate the communication of synchronization information with another electronic device in a wireless network, the electronic device provides a request for the synchronization information to the other electronic device at a time other than a predefined synchronization transmission time of the other electronic device. Then, the electronic device receives the synchronization information from the other electronic device in response to the request. In this way, the probability that the synchronization information is successfully communicated is increased, and the amount of time the electronic device is in an active mode is reduced, thereby reducing power consumption.

25 Claims, 5 Drawing Sheets

SYNCHRONIZATION REQUESTS TO REDUCE POWER CONSUMPTION

CROSS REFERENCE TO RELATED APPLICATION

This application claims priority under 35 U.S.C. §119(e) to U.S. Provisional Application Ser. No. 61/705,022, entitled "Synchronization Requests to Reduce Power Consumption," by Kapil Chhabra and Veerendra M. Boodannavar, filed on Sep. 24, 2012, the contents of which is herein incorporated by reference.

BACKGROUND

Field

The described embodiments relate to techniques for synchronizing clocks in electronic devices in a wireless network.

Related Art

Many modern electronic devices include a networking subsystem that is used to wirelessly communicate with other electronic devices. For example, these electronic devices can include a networking subsystem with a cellular network interface (UMTS, LTE, etc.), a wireless local area network interface (e.g., a wireless network such as described in the Institute of Electrical and Electronics Engineers (IEEE) 802.11 standard or Bluetooth™ from the Bluetooth Special Interests Group of Kirkland, Wash.), and/or another type of wireless interface. In order to reduce power consumption when there is no information being wirelessly communicated, these electronic devices often transition the networking subsystem to a standby mode.

However, if the networking subsystem in an electronic device is in standby mode for too long, the clock in the electronic device may lose its synchronization with the clock in another electronic device in a wireless network. As a consequence, the electronic device may routinely re-synchronize its clock with the clock in the other electronic device.

For example, an electronic device that communicates with an access point in a wireless network using a communication protocol that is compatible with an IEEE 802.11 standard (which is sometimes referred to as 'Wi-Fi') may wake up its radio periodically to receive a beacon frame with synchronization information (such as a timestamp) at beacon transmission times. After receiving the beacon, the Wi-Fi radio in the electronic device may use the synchronization information to synchronize the radio clock. In addition, the Wi-Fi radio may check the Traffic Indication Map (TIM) element for data for the electronic device that is buffered at the access point.

In practice, it can be difficult to synchronize electronic devices in the wireless network in this way. In particular, in busy environments, the probability of not receiving the beacon is high. As a consequence, the Wi-Fi radio in the electronic device may stay in an active mode longer while waiting for the beacon, which may not arrive due to interference. Moreover, if the Wi-Fi radios in multiple electronic devices wake up to receive the beacon at a beacon transmission time and the beacon indicates there is buffered data for these electronic devices, the electronic devices may poll the access point for the buffered data at the same time, thereby contending with each other for access-point resources.

Furthermore, because of the risk of losing synchronization with the access point and waking up the Wi-Fi radio at the wrong time if the electronic device is in standby mode too often or if it stays in standby mode too long, the electronic device may wake up the Wi-Fi radio frequently.

Therefore, the existing synchronization technique in wireless networks may result in the electronic device staying in the active mode more often. This increases the power consumption and reduces the operating time of the electronic device, which can frustrate users and degrade the user experience.

SUMMARY

The described embodiments include an electronic device. This electronic device includes: an antenna; an interface circuit, coupled to the antenna, that communicates with another electronic device using a connection in a wireless network; a processor coupled to the interface circuit; and memory that stores a program module that is executed by the processor. The program module facilitates receipt of synchronization information from another electronic device. In particular, the program module includes: instructions for providing a request for the synchronization information to the other electronic device at a time other than a predefined synchronization transmission time of the other electronic device; and instructions for receiving the synchronization information from the other electronic device in response to the request.

In some embodiments, the program module includes instructions for synchronizing a clock in the electronic device based on the synchronization information. Additionally, the program module may include: instructions for providing a second request for a pending traffic summary for the electronic device to the other electronic device; and instructions for receiving the pending traffic summary from the other electronic device. Note that the second request may be included in the request.

Moreover, the other electronic device may include an access point in the wireless network.

Furthermore, the request may be compatible with an Institute of Electrical and Electronics Engineers (IEEE) 802.11 standard.

Additionally, the predefined synchronization transmission time may include a target beacon transmission time.

Another embodiment provides a computer-program product for use with the electronic device. This computer-program product includes instructions for at least some of the operations performed by the electronic device.

Another embodiment provides a method for receipt of the synchronization information from the other electronic device in the wireless network, which may be performed by the electronic device. During the method, the electronic device may perform at least some of the operations described above.

Another embodiment provides the other electronic device. This other electronic device includes: an antenna; an interface circuit, coupled to the antenna, that communicates with the electronic device using the connection in the wireless network; a processor coupled to the interface circuit; and memory that stores a program module that is executed by the processor. The program module facilitates providing the synchronization information to the electronic device. In particular, program module includes: instructions for: receiving the request for the synchronization information from the electronic device at the time other than the predefined synchronization transmission time of the other electronic device; and providing the synchronization information to the electronic device in response to the request.

In some embodiments, the program module further includes instructions for providing the synchronization information to the electronic device a second time in response to the request. Additionally, the program module may include: instructions for receiving the second request for the pending traffic summary for the electronic device from the electronic device; and instructions for providing the pending traffic summary to the electronic device. This second request may be included in the request.

Moreover, the request may be compatible with an Institute of Electrical and Electronics Engineers (IEEE) 802.11 standard.

Furthermore, the predefined synchronization transmission time may include the target beacon transmission time.

Another embodiment provides a second computer-program product for use with the other electronic device. This second computer-program product includes instructions for at least some of the operations performed by the other electronic device.

Another embodiment provides a second method for providing the synchronization information to the electronic device in the wireless network, which may be performed by the other electronic device. During the second method, the other electronic device may perform at least some of the operations described above.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

In order to facilitate the communication of synchronization information between an electronic device (such as a smartphone) and another electronic device (such as an access point) in a wireless network, the electronic device provides a request for the synchronization information to the other electronic device at a time other than a predefined synchronization transmission time of the other electronic device. Then, the electronic device receives the synchronization information from the other electronic device in response to the request. In this way, the probability that the synchronization information is successfully communicated is increased, and the amount of time the electronic device is in an active mode is reduced, thereby reducing power consumption.

For example, the request and the synchronization information may be conveyed in packets that are transmitted and received by radios in the electronic devices in accordance with a communication protocol, such as an Institute of Electrical and Electronics Engineers (IEEE) 802.11 standard, Bluetooth™ (from the Bluetooth Special Interests Group of Kirkland, Wash.), and/or another type of wireless interface. In the discussion that follows, IEEE 802.11 (such as Wi-Fi) is used as an illustrative example. Thus, the predefined synchronization transmission time may include a target beacon transmission time.

Figure 1:
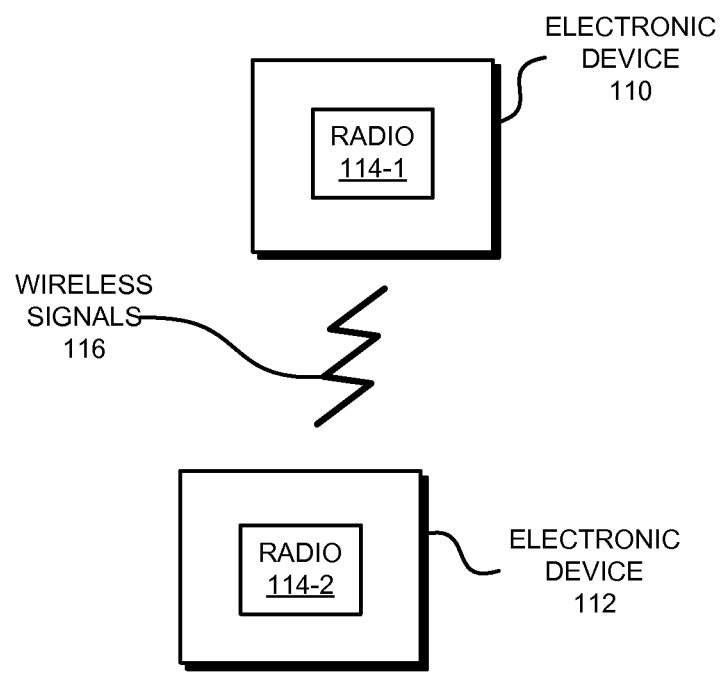
FIG. 1 is a block diagram illustrating electronic devices wirelessly communicating in accordance with an embodiment of the present disclosure.

The communication between the electronic devices is shown in FIG. 1, which presents a block diagram illustrating electronic devices 110 and 112 wirelessly communicating. In particular, these electronic devices may wirelessly communicate while: discovering one another by scanning wireless channels, transmitting and receiving advertising frames on wireless channels, establishing connections (for example, by transmitting connect requests), and/or transmitting and receiving packets (which may include the request and/or the synchronization information as payloads).

Figure 5:
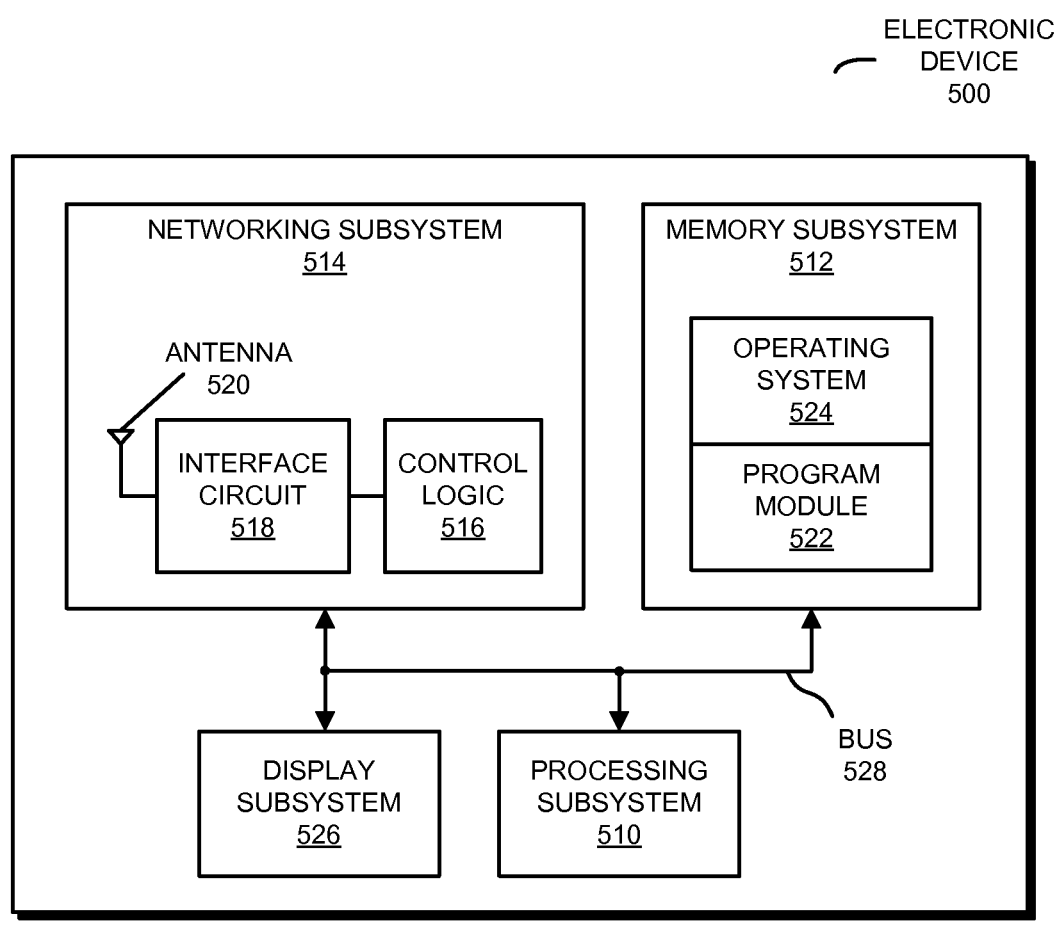
FIG. 5 is a block diagram illustrating one of the electronic devices of FIG. 1 in accordance with an embodiment of the present disclosure.

As described further below with reference to FIG. 5, electronic devices 110 and 112 may include subsystems, such as a networking subsystem, a memory subsystem and a processor subsystem. In addition, electronic devices 110 and 112 may include radios 114 in the networking subsystems. More generally, electronic devices 110 and 112 can include (or can be included within) any electronic devices with the networking subsystems that enable electronic devices 110 and 112 to wirelessly communicate with another electronic device. This can comprise transmitting advertising frames on wireless channels to enable electronic devices to make initial contact, followed by exchanging subsequent data/management frames (such as connect requests) to establish a connection, configure security options (e.g., IPSEC), transmit and receive packets or frames via the connection, etc.

As can be seen in FIG. 1, wireless signals 116 (represented by a jagged line) are transmitted from a radio 114-1 in electronic device 110. These wireless signals 116 are received by radio 114-2 in electronic device 112.

In the described embodiments, processing a packet or frame in either of electronic devices 110 and 112 includes: receiving wireless signals 116 with the packet or frame; decoding/extracting the packet or frame from received wireless signals 116 to acquire the packet or frame; and processing the packet or frame to determine information contained in the packet or frame (such as the request or the synchronization information in the payload).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

Figure 2:
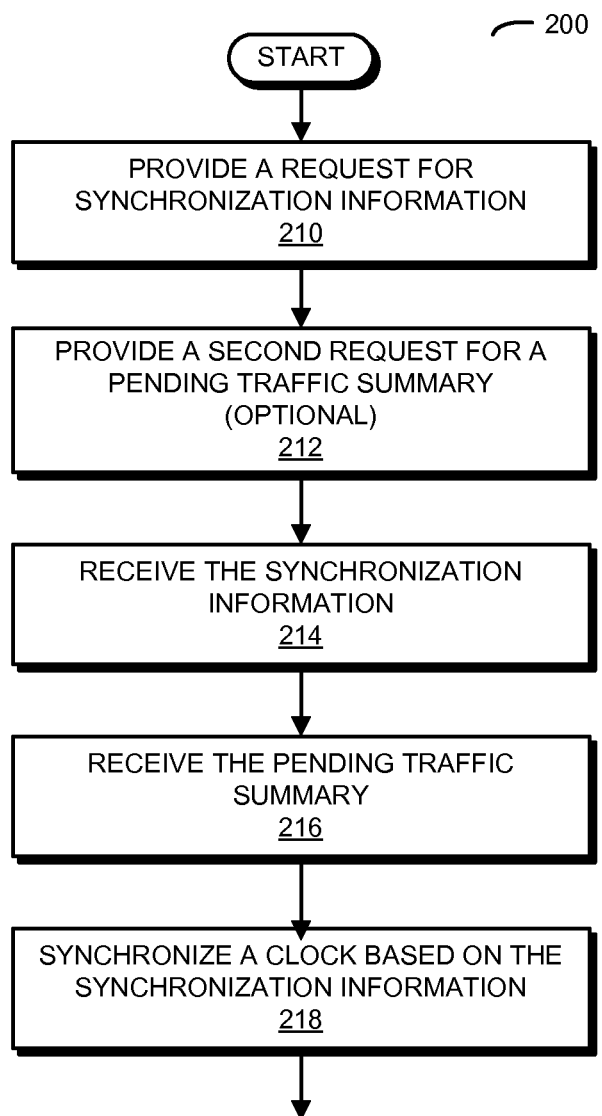
FIG. 2 is a flow diagram illustrating a method for receipt of synchronization information from one of the electronic devices in FIG. 1 in accordance with an embodiment of the present disclosure.

FIG. 2 presents a flow diagram illustrating a method 200 for receipt of synchronization information from one of the electronic devices in FIG. 1, such as electronic device 110. During operation, the electronic device provides a request for the synchronization information (operation 210) to another electronic device at a time other than a predefined synchronization transmission time of the other electronic device. In response to the request, the electronic device receives the synchronization information (operation 214) from the other electronic device.

Additionally, the electronic device may optionally provide a second request for a pending traffic summary (operation 212) for the electronic device to the other electronic device. In response to the optional second request, the electronic device may receive the pending traffic summary (operation 216) from the other electronic device. Note that the second request may be included in the request. Therefore, as described further below with reference to FIG. 4, in some embodiments operations 210 and 212 and/or operations 214 and 216 may be combined (for example, the second request may be included in the same packet as the request and/or the pending traffic summary may be include in the same packet as the synchronization information).

In some embodiments, the electronic device optionally synchronizes a clock (operation 218) in the electronic device based on the synchronization information.

Figure 3:
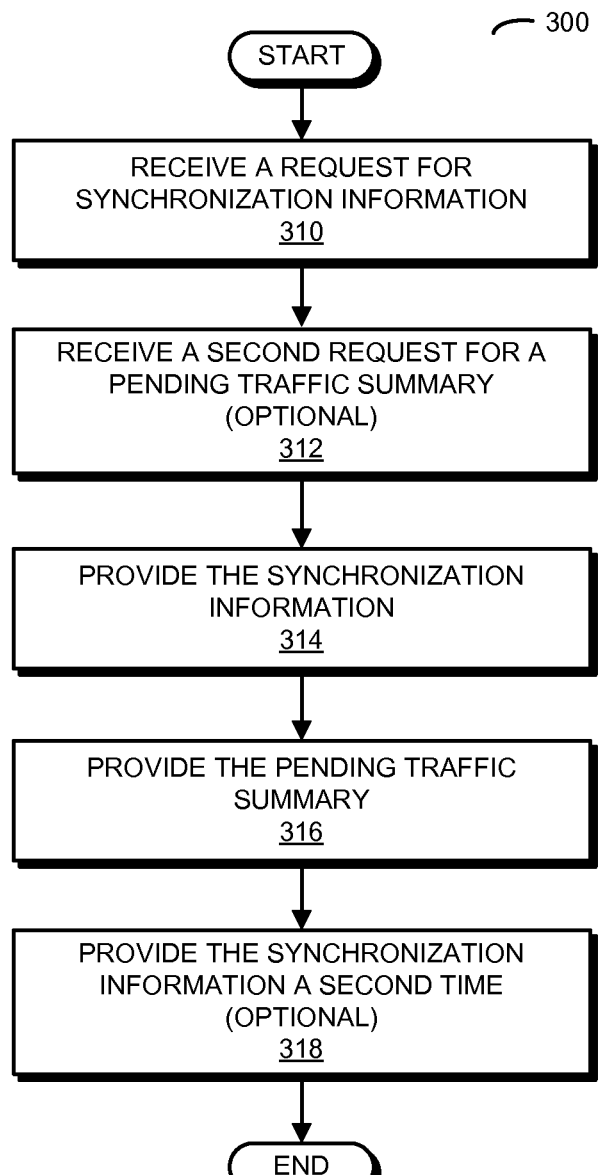
FIG. 3 is a flow diagram illustrating a method for providing the synchronization information to another of the electronic devices of FIG. 1 in accordance with an embodiment of the present disclosure.

FIG. 3 presents a flow diagram illustrating a method for providing the synchronization information to another of the electronic devices of FIG. 1, such as electronic device 112. During operation, the other electronic device receives the request for the synchronization information (operation 310) from the electronic device at the time other than the predefined synchronization transmission time of the other electronic device. In response to the request, the other electronic device provides the synchronization information (operation 314) to the electronic device.

In some embodiments, in response to the request, the other electronic device optionally provides the synchronization information to the electronic device a second time (operation 318). This second instance of the providing may increase the likelihood that the synchronization information is received by the electronic device.

Additionally, the other electronic device may optionally receive the second request for the pending traffic summary (operation 312) for the electronic device from the electronic device. Then, the other electronic device may provide the pending traffic summary (operation 316) to the electronic device. As noted previously, the second request may be included in the request. Therefore, as described further below with reference to FIG. 4, in some embodiments operations 310 and 312 and/or operations 314 and 316 may be combined.

In these ways, the electronic devices (for example, program modules in the electronic devices) may facilitate the communication of the synchronization information between the electronic devices. By facilitating this communication at an arbitrary time and in a more reliable fashion, this communication technique may reduce the power consumption of electronic device 110 (FIG. 1). In particular, the electronic device is more likely to receive the synchronization information in response to the request (as opposed to transitioning to the active mode at the predefined synchronization transmission time of the other electronic device). Therefore, the electronic device does not need to remain in the active mode as long. In addition, because the requests from different electronic devices to the other electronic device in the wireless network can be at arbitrary times (for example, random times), competition for scarce network resources can be avoided. By reducing the probability of contention, the amount of time the electronic device spends in the active mode can also be reduced.

In some embodiments of methods 200 (FIG. 2) and 300, there may be additional or fewer operations. Moreover, the order of the operations may be changed, and/or two or more operations may be combined into a single operation.

In an exemplary embodiment, the communication technique allows a portable electronic device (i.e., a wireless client) to synchronize its Wi-Fi radio clock with the clock in an access point. Instead of transitioning to an active mode at the target beacon transmission time of the access point, software (such as a program module) in the portable electronic device may transition the portable electronic device to the active mode and may provide the request at an arbitrary time during the time interval between target beacon transmission times of the access point. Similarly, in response to the request, software (such as a program module) in the portable electronic device may provide the synchronization information (for example, the beacon) and/or the Traffic Indication Map or TIM (i.e., the pending traffic summary). Note that the TIM may include a buffered traffic indication or summary of buffered data for the portable electronic device at the access point.

Referring back to FIG. 1, during the communication technique electronic device 110 does not wake periodically to receive beacons from electronic device 112 (i.e., by passively waiting for a beacon in a broadcast frame). Instead electronic device 110 actively queries electronic device 112 for the synchronization information and/or the traffic buffered indication for electronic device 110 at electronic device 112 (i.e., the access point). In particular, electronic device 110 can send requests for clock synchronization information and/or buffered traffic indication in a management frame, which may be either part of an action frame (which is a generalized request frame) or a probe request frame (when electronic device 110 is scanning for an access point when roaming), which can also include a piggy-backed TIM request.

In response to the request, electronic device 112 may pass on the clock synchronization information and/or the buffered unicast traffic indication (which indicates if there is buffered data for electronic device 110). For example, the buffered unicast traffic indication may be included in a beacon frame or a TIM indication frame. After receiving this response, if there is no indication of traffic for electronic device 110 in the TIM, electronic device 110 can transition the Wi-Fi radio to the standby mode. Alternatively, if there is traffic for electronic device 110, electronic device 110 may synchronize with the timing synchronization function and collect the buffered data from electronic device 112.

Figure 4:
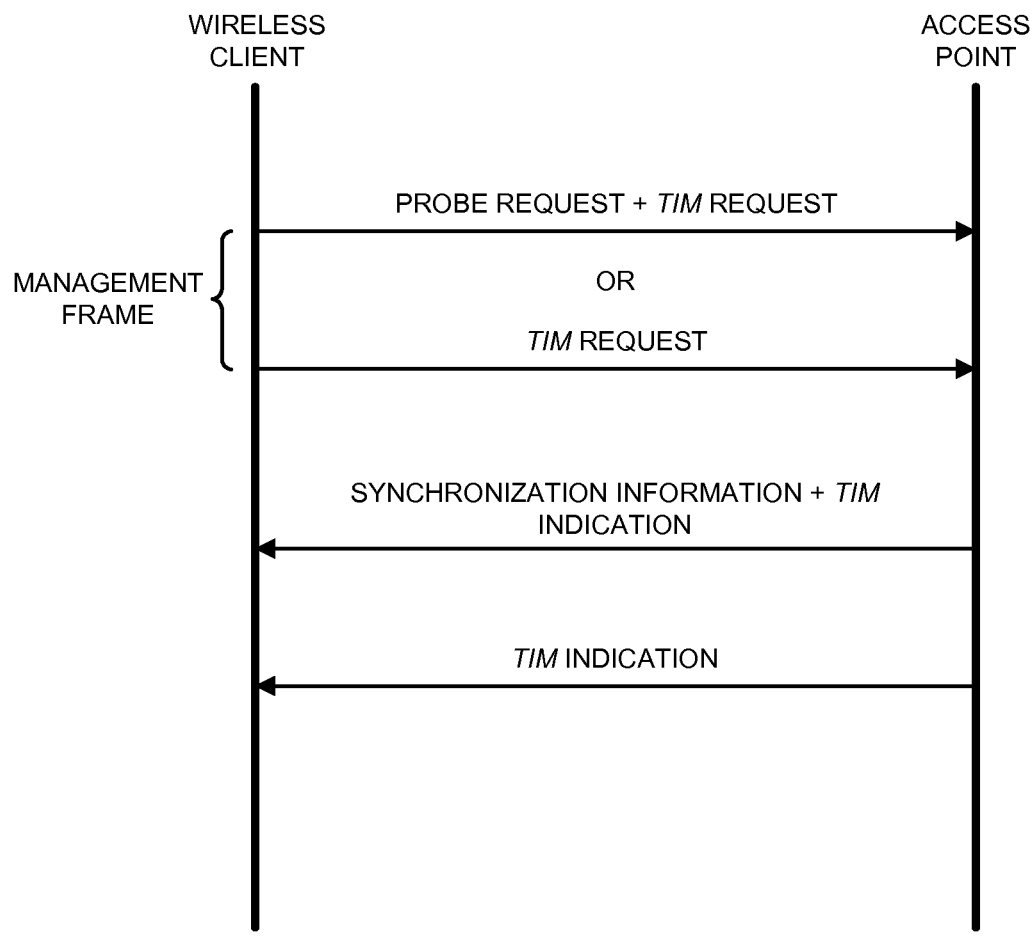
FIG. 4 is a drawing illustrating communication between the electronic devices of FIG. 1 in accordance with an embodiment of the present disclosure.

The handshaking in the communication technique is illustrated in FIG. 4, which presents a drawing illustrating communication between electronic devices 110 and 112 in FIG. 1. In particular, the access point may receive a management frame that includes a probe request and a TIM request, or just a TIM request. In response, the access point may provide two response frames for reliability. The first response frame may include the synchronization information and the TIM indication, and the second response frame may include the TIM indication. In some embodiments, the second response frame also includes the synchronization information.

Because the frames for querying the clock synchronization information and the responses and/or buffered traffic information from the access point are unicast and positively acknowledged, the likelihood of the electronic device receiving these frames is significantly improved in busy environments. Moreover, the communication technique places less stringent requirements on the electronic device remaining in synchronization with the access point because the electronic device is free to wake at any time and query the access point. Furthermore, different electronic devices in the wireless network can chose a random offset from the target beacon transmission time of the access point to schedule when they wake-up (so that overlap of the active modes of the different wireless clients is reduced or eliminated). Alternatively, the access point may manage the wake-up offset for the electronic device, and may provide this information in the response frame. Different values of such a random wake-up offset for different electronic devices can ensure that the electronic devices will (statistically) wake-up asynchronously with respect to each, thereby reducing or eliminating contention for access-point resources.

In this way, the electronic devices can query synchronization information and/or buffered traffic on demand, and they can shut down their wireless radios (i.e., transition to standby mode) at other times, thereby significantly reducing power consumption of the electronic devices.

We now describe embodiments of the electronic device. FIG. 5 presents a block diagram illustrating an electronic device 500, such as one of electronic devices 110 and 112 in FIG. 1. This electronic device includes processing subsystem 510, memory subsystem 512, and networking subsystem 514. Processing subsystem 510 includes one or more devices configured to perform computational operations. For example, processing subsystem 510 can include one or more microprocessors, application-specific integrated circuits (ASICs), microcontrollers, programmable-logic devices, and/or one or more digital signal processors (DSPs).

Memory subsystem 512 includes one or more devices for storing data and/or instructions for processing subsystem 510 and networking subsystem 514. For example, memory subsystem 512 can include dynamic random access memory (DRAM), static random access memory (SRAM), and/or other types of memory. In some embodiments, instructions for processing subsystem 510 in memory subsystem 512 include: one or more program modules or sets of instructions (such as program module 522), which may be executed by processing subsystem 510. Note that the one or more computer programs may constitute a computer-program mechanism. Moreover, instructions in the various modules in memory subsystem 512 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 510.

In addition, memory subsystem 512 can include mechanisms for controlling access to the memory. In some embodiments, memory subsystem 512 includes a memory hierarchy that comprises one or more caches coupled to a memory in electronic device 500. In some of these embodiments, one or more of the caches is located in processing subsystem 510.

In some embodiments, memory subsystem 512 is coupled to one or more high-capacity mass-storage devices (not shown). For example, memory subsystem 512 can be coupled to a magnetic or optical drive, a solid-state drive, or another type of mass-storage device. In these embodiments, memory subsystem 512 can be used by electronic device 500 as fast-access storage for often-used data, while the mass-storage device is used to store less frequently used data.

Networking subsystem 514 includes one or more devices configured to couple to and communicate on a wired and/or wireless network (i.e., to perform network operations), including: control logic 516, an interface circuit 518 and an antenna 520. For example, networking subsystem 514 can include a Bluetooth™ networking system, a cellular networking system (e.g., a 5G/4G network such as UMTS, LTE, etc.), a universal serial bus (USB) networking system, a networking system based on the standards described in IEEE 802.11 (e.g., a Wi-Fi networking system), an Ethernet networking system, and/or another networking system.

Networking subsystem 514 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 500 may use the mechanisms in networking subsystem 514 for performing simple wireless communication between the electronic devices, e.g., transmitting advertising frames and/or scanning for advertising frames transmitted by other electronic devices as described previously.

Within electronic device 500, processing subsystem 510, memory subsystem 512, and networking subsystem 514 are coupled together using bus 528. Bus 528 may include an electrical, optical, and/or electro-optical connection that the subsystems can use to communicate commands and data among one another. Although only one bus 528 is shown for clarity, different embodiments can include a different number or configuration of electrical, optical, and/or electro-optical connections between the subsystems.

In some embodiments, the electronic device includes a display subsystem 526 for displaying information on a display, which may include a display driver and the display, such as a liquid-crystal display, a multi-touch touchscreen, etc.

Electronic device 500 can be (or can be included in) any electronic device with at least one network interface. For example, electronic device 500 can be (or can be included in): a desktop computer, a laptop computer, a server, a media player (such as an MP5 player), an appliance, a subnotebook/netbook, a tablet computer, a smartphone, a cellular telephone, a piece of testing equipment, a network appliance, a set-top box, a personal digital assistant (PDA), a toy, a controller, a digital signal processor, a game console, a computational engine within an appliance, a consumer-electronic device, a portable computing device, a personal organizer, and/or another electronic device.

Although specific components are used to describe electronic device 500, in alternative embodiments, different components and/or subsystems may be present in electronic device 500. For example, electronic device 500 may include one or more additional processing subsystems 510, memory subsystems 512, networking subsystems 514, and/or display subsystems 526. Additionally, one or more of the subsystems may not be present in electronic device 500. Moreover, in some embodiments, electronic device 500 may include one or more additional subsystems that are not shown in FIG. 5. For example, electronic device 500 can include, but is not limited to, a data collection subsystem, an audio and/or video subsystem, an alarm subsystem, a media processing subsystem, and/or an input/output (I/O) subsystem. Also, although separate subsystems are shown in FIG. 5, in some embodiments, some or all of a given subsystem or component can be integrated into one or more of the other subsystems or component(s) in electronic device 500. For example, in some embodiments program module 522 is included in operating system 524.

Moreover, the circuits and components in electronic device 500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 514, such as a radio. Moreover, the integrated circuit may include hardware and/or software mechanisms that are used for transmitting wireless signals from electronic device 500 and receiving signals at electronic device 500 from other electronic devices. Aside from the mechanisms herein described, radios are generally known in the art and hence are not described in detail. In general, networking subsystem 514 and/or the integrated circuit can include any number of radios. Note that the radios in multiple-radio embodiments function in a similar way to the described single-radio embodiments.

In some embodiments, networking subsystem 514 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, etc.)

While a communication protocol compatible with the IEEE 802.11 standard was used as an illustrative example, the described embodiments of the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, program module 522 can be implemented in a file layer in an access point (such as electronic device 112 in FIG. 1) or in firmware in a wireless client (such as electronic device 110 in FIG. 1). Alternatively or additionally, at least a portion of the communication technique may be implemented in a physical layer in the access point and/or the wireless client.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
   an interface circuit configured to communicate with another electronic device; and
   a processor coupled to the interface circuit and configured to:
   provide a request for synchronization information to the other electronic device at a time other than a predefined synchronization transmission time of the other electronic device;
   receive a first response containing the synchronization information from the other electronic device in response to the request;
   receive a second response from the other electronic device in response to the request, wherein the second response comprises pending traffic information; and
   keep the interface circuit in a standby mode at the predefined synchronization transmission time of the other electronic device, thereby not transitioning to an active mode to receive beacon frames transmitted from the other electronic device at the predefined synchronization transmission time.

2. The electronic device of claim 1, wherein the processor is further configured to synchronize a clock in the electronic device based on at least the synchronization information.

3. The electronic device of claim 1, wherein the processor is further configured to:
   provide a second request for a pending traffic summary for the electronic device to the other electronic device; and
   receive the pending traffic summary from the other electronic device.

4. The electronic device of claim 1, wherein the other electronic device comprises an access point in a wireless network.

5. The electronic device of claim 1, wherein the predefined synchronization transmission time comprises a target beacon transmission time.

6. The device of claim 1, wherein the request for the synchronization information comprises a request for a pending traffic summary.

7. The device of claim 1, wherein the second response comprises a traffic indication map.

8. The device of claim 1, wherein the processor is further configured to place the interface circuit in the standby mode in response to receiving the synchronization information.

9. The electronic device of claim 3, wherein the second request is included in the request.

10. A computer-program product for use in conjunction with an electronic device, the computer-program product comprising a non-transitory computer-readable storage medium and a computer-program mechanism embedded therein, to facilitate receipt of synchronization information from another electronic device in a wireless network, the computer-program mechanism including:
    instructions for providing a request for the synchronization information to the other electronic device at a time other than a predefined synchronization transmission time of the other electronic device using a connection in the wireless network;
    instructions for receiving a first response containing the synchronization information from the other electronic device in response to the request, wherein the second response comprises pending traffic information;

instructions for receiving a second response from the other electronic device in response to the request; and
instructions for keeping an interface circuit in the electronic device in a standby mode at the predefined synchronization transmission time of the other electronic device, thereby not transitioning to an active mode to receive beacon frames transmitted from the other electronic device at the predefined synchronization transmission time.

11. The computer-program product of claim 10, wherein the computer program mechanism further includes:
instructions for providing a second request for a pending traffic summary for the electronic device from the other electronic device; and
instructions for receiving the pending traffic summary from the other electronic device.

12. A method for receipt of synchronization information by an electronic device from another electronic device in a wireless network, the method comprising:
providing a request for the synchronization information to the other electronic device at a time other than a predefined synchronization transmission time of the other electronic device using a connection in the wireless network;
receiving a first response containing the synchronization information from the other electronic device in response to the request;
receiving a second response from the other electronic device in response to the request, wherein the second response comprises pending traffic information; and
keeping an interface circuit of the electronic device in a standby mode at the predefined synchronization transmission time of the other electronic device, thereby not transitioning to an active mode to receive beacon frames transmitted from the other electronic device at the predefined synchronization transmission time.

13. The method of claim 12, further comprising:
providing a second request for a pending traffic summary for the electronic device from the other electronic device; and
receiving the pending traffic summary from the other electronic device.

14. An electronic device, comprising:
an interface circuit configured to communicate with another electronic device; and
a processor coupled to the interface circuit and configured to:
receive a request for synchronization information from the other electronic device at a time other than a predefined synchronization transmission time of the electronic device;
provide a first response containing the synchronization information to the other electronic device in response to the request, the providing occurring in place of providing the synchronization information at subsequent predefined synchronization transmission time of the electronic device; and
provide a second response containing the synchronization information to the other electronic device in response to the request, wherein the second response comprises pending traffic information.

15. The electronic device of claim 14, wherein the processor is further configured to provide the synchronization information to the other electronic device a second time in response to the request.

16. The electronic device of claim 14, wherein the processor is further configured to:
receive a second request for a pending traffic summary for the other electronic device from the other electronic device; and
provide the pending traffic summary to the other electronic device.

17. The electronic device of claim 14, wherein the predefined synchronization transmission time comprises a target beacon transmission time.

18. The device of claim 14, wherein the request for the synchronization information comprises a request for a pending traffic summary.

19. The device of claim 14, wherein the second response comprises a traffic indication map.

20. The device of claim 14, wherein the second response comprises a traffic indication map and synchronization information.

21. The electronic device of claim 16, wherein the second request is included in the request.

22. A computer-program product for use in conjunction with an electronic device, the computer-program product comprising a non-transitory computer-readable storage medium and a computer-program mechanism embedded therein, to facilitate providing of synchronization information to another electronic device in a wireless network, the computer-program mechanism including:
instructions for receiving a request for the synchronization information from the other electronic device at a time other than a predefined synchronization transmission time of the electronic device using a connection in the wireless network;
instructions for providing a first response containing the synchronization information to the other electronic device in response to the request, the providing occurring in place of providing the synchronization information at subsequent predefined synchronization transmission time of the electronic device; and
instructions for providing a second response to the other electronic device in response to the request, wherein the second response comprises pending traffic information.

23. The computer-program product of claim 22, wherein the computer program mechanism further includes:
instructions for receiving a second request for a pending traffic summary for the other electronic device from the other electronic device; and
instructions for providing the pending traffic summary to the other electronic device.

24. A method for providing synchronization information from an electronic device to another electronic device in a wireless network, the method comprising:
receiving a request for the synchronization information from the other electronic device at a time other than a predefined synchronization transmission time of the electronic device using a connection in the wireless network;
providing a first response containing the synchronization information to the other electronic device in response to the request, the providing occurring in place of providing the synchronization information at subsequent predefined synchronization transmission time of the electronic device; and
providing a second response to the other electronic device in response to the request, wherein the second response comprises pending traffic information.

25. The method of claim 24, further comprising:
receiving a second request for a pending traffic summary for the other electronic device from the other electronic device; and
providing the pending traffic summary to the other electronic device.

\* \* \* \* \*